United States Patent [19]

Püschel et al.

[11] Patent Number: 4,744,743
[45] Date of Patent: May 17, 1988

[54] MEANS FOR PRESSURE AND QUANTITY CONTROL OF THE HYDRAULIC DRIVES OF AN INJECTION MOULDING MACHINE

[75] Inventors: Reiner Püschel, Lohr-Steinbach, Fed. Rep. of Germany; Karl Krieger, Gallneukirchen, Austria

[73] Assignee: Mannesmann Rexroth GmbH, Fed. Rep. of Germany

[21] Appl. No.: 920,583

[22] Filed: Oct. 17, 1986

[30] Foreign Application Priority Data

Oct. 21, 1985 [DE] Fed. Rep. of Germany ....... 3537423

[51] Int. Cl.[4] .................. B29C 45/77; B29C 45/80
[52] U.S. Cl. .................... 425/145; 264/40.5; 425/146; 425/170
[58] Field of Search .............. 425/145, 146, 149, 170, 425/543, 591; 264/40.3, 40.5, 40.7, 40.1, 328.6

[56] References Cited

U.S. PATENT DOCUMENTS 3,771,935 11/1973 Loichen .......................... 425/146
4,020,633 5/1977 Hehl ............................... 60/911
4,060,362 11/1977 Wilson, III ..................... 425/145

FOREIGN PATENT DOCUMENTS

2528963A1 1/1977 Fed. Rep. of Germany .
3404927A1 8/1985 Fed. Rep. of Germany .

Primary Examiner—Jay H. Woo
Assistant Examiner—Timothy W. Heitbrink
Attorney, Agent, or Firm—Harness, Dickey & Pierce

[57] ABSTRACT

In a plastic processing machine (injection moulding machine) the amount of working medium to be supplied to the hydraulic drives and to the injection cylinder and the clamping cylinder is regulated to control the adjustment rates via a quantity control of an adjustment pump. The setting of the pressures necessary at the drives is effected in contrast via a directional valve which controls the fluid paths to one of the drives and which is adapted to be connected to the tank via a regulatable throttle point governing the pressure. This simplifies the apparatus expenditure for the pressure control of such a machine.

10 Claims, 3 Drawing Sheets

MEANS FOR PRESSURE AND QUANTITY CONTROL OF THE HYDRAULIC DRIVES OF AN INJECTION MOULDING MACHINE

BACKGROUND OF THE INVENTION

The invention relates to a means for pressure and quantity control of the hydraulic drives of an injection moulding machine having the features set forth in the preamble of claim 1.

In such plastic processing machines various hydraulic drives are provided, in particular an injection cylinder for injecting the plastic into the mould and a clamping cylinder for the opening and closing movement of the displaceable mould half and these must be actuated on the one hand in accordance with a predetermined speed program and on the other must be subjected to specific pressures to hold the mould halves together, lower the pressure before closure of the mould to avoid damage to the mould should a casting not be completely ejected and to generate a predetermined after pressure in the injection cylinder after insertion of the plastic into the mould to keep the mould cavity filled with plastic. According to the prior art the particular displacement necessary and the desired pressure can be generated with a regulating pump, i.e. a pump with variable displacement. Combined pressure regulators and quantity regulators for such variable displacement pumps are known. The pressure regulating time depends on the relatively sluggish response behaviour of such pumps. If for example the pressure drop does not take place fast enough the injection pressure of the injection cylinder may rise to such an extent that the clamping pressure of the mould is briefly exceeded and plastic emerges.

If however the pressure is governed at a pressure valve connected to the pressure line of the adjusting pump an additional regulatable valve is required.

The problem underlying the invention therefore resides in simplifying the quantity or volumetric and pressure control of an injection moulding machine.

SUMMARY OF THE INVENTION

Said problem is solved according to the invention by the features set forth in claim 1.

The regulating or variable displacement pump thus has only a quantity control whilst the pressure control is effected at a directional valve which is required in any case for a drive of the plastic processing machine. This directional valve thus has several functions, i.e. controlling the fluid paths from the pressure line of the pump to the drive, regulating the pressure in the respective drive and also regulating the system pressure in the pressure line. Thus, all pressure regulating operations may be effected at a single directional valve which in accordance with claim 2 is provided for the fluid control to the injection cylinder.

Further advantageous developments of the invention are characterized in the subsidiary claims. Thus, the directional valve connecting the injection cylinder to the pressure line of the pump may advantageously be made as proportional valve or in another embodiment a directional valve can be provided which cooperates with a pressure-limiting valve to set the pressures necessary in the system and in the injection cylinder.

BRIEF DESCRIPTION OF THE DRAWINGS

Examples of embodiment of the invention will be explained hereinafter in detail with the aid of the drawings, wherein.

DETAILED DESCRIPTION OF THE PREFERRED EMBODIMENTS OF THE INVENTION

Figure 1:
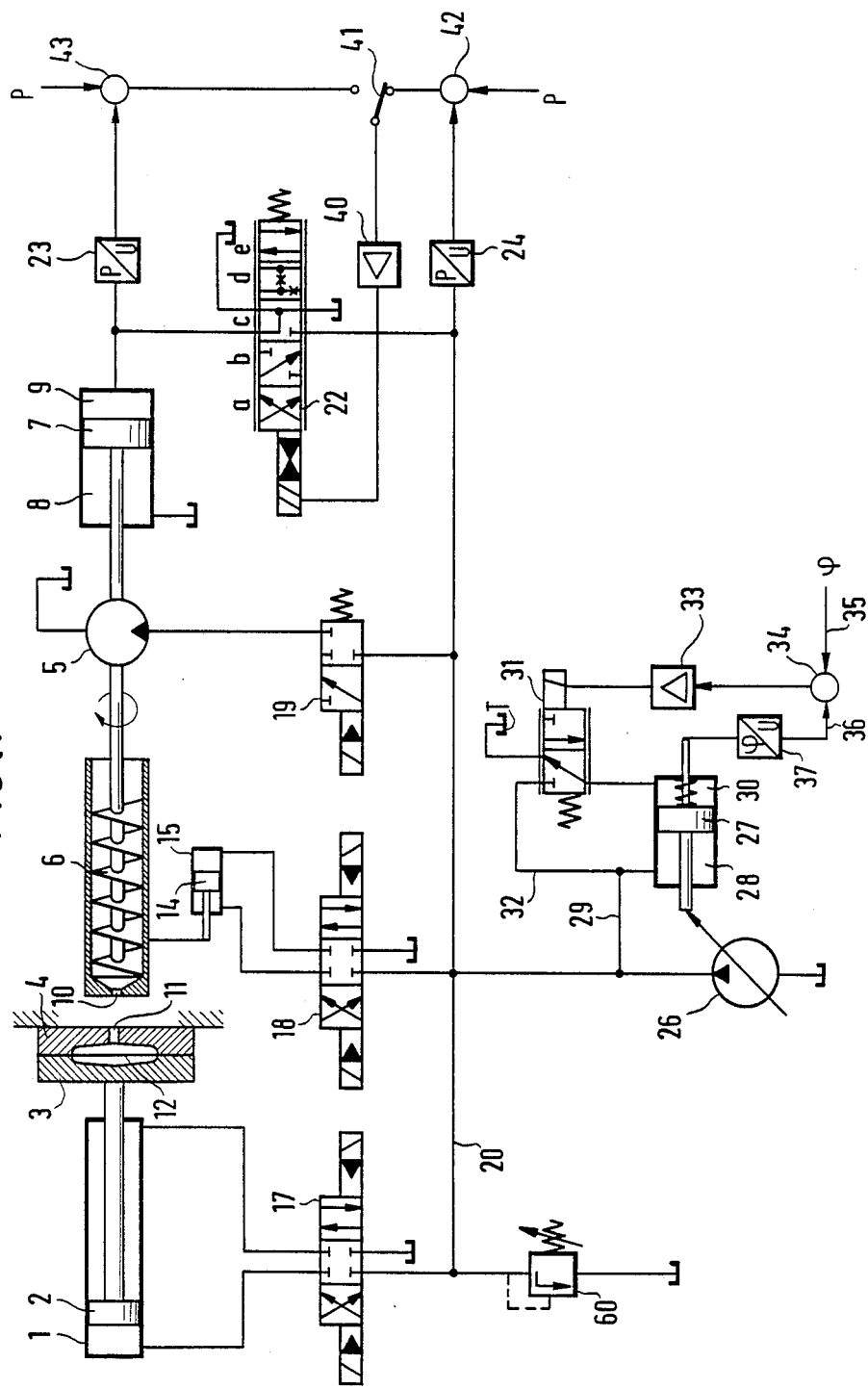
FIG. 1 is a schematic view of the drives of an injection moulding machine and the valves associated therewith.

In FIG. 1 a clamping cylinder 1 is shown by the piston 2 of which a movable mould half 3 is displaceable between an open position which is not illustrated and the closure position which is illustrated in the drawings and in which the mould half 3 is applied to the stationary mould half 4. A hydraulic motor 5 drives a plasticizing screw 6 in which plastic granulate introduced in a manner not illustrated is heated and plasticized during the rotating. The motor 5 and the plasticizing screw 6 are connected to the piston 7 of an injection cylinder 8. If the cylinder chamber 9 is supplied with working medium, the piston 7 dislaces the plasticized plastic through an injection nozzle 10 and a filling opening 11 into the mould cavity 12 of the mould 3, 4. The injection nozzle 10 is secured to the piston 14 of a cylinder 15 by which prior to the insertion of the plastic the injection nozzle 10 is pressed firmly against the mould half 4. Further auxiliary drives such as the likewise hydraulically actuated ejector necessary for removing the injection moulding after the opening of the mould 3, 4 are not illustrated.

For supplying working medium to the clamping cylinder 1 and cylinder 15 conventional directional valves 17 and 18 are provided and are electrically actuated as switching valves and have four ports or connections and three positions. The connection of the motor 5 to the pressure line 20 is effected via a further switching valve 19. The cylinder chamber 9 of the injection cylinder 8 is connected via a proportional directional valve 22 to the pressure line 20. The pressure in the injection cylinder is measured by a pressure sensor 23 and the pressure in the line 20 by a pressure sensor 24.

Connected to the pressure line 20 is a displacement pump 26 of variable volume. The displacement adjustment of the pump is by an adjusting piston 27, the piston chamber 28 being connected via a line 29 to the pressure line 20 and the opposite piston chamber 30 being connected to the line 29 via a proportional valve 31 by which the control pressure in the piston chamber 30 and thus the displacement of the pump 26 can be set. If the control pressure in the piston chamber 30 drops because corresponding to the position of the proportional valve 31 more working medium is branched from the branch line 32 to the tank T, the displacement is reduced. If however the control pressure at the proportional valve 31 increases the piston 27 is displaced in the direction of greater displacement of the pump 26.

The driving of the proportional valve 31 is by a correcting variable at the output of the control amplifier 33 which is supplied by a comparator 34 with the control deviation which consists of a command quantity as desired value on the line 35 and a controlling variable on the line 36. The controlling variable is obtained in a transducer 37 which measures the stroke displacement of the piston 27 and thus the position of the displacement adjusting member.

A quantity or volumetric control is thus provided for the adjustment pump 26. Via the desired value input 35 the desired displacement can be set which makes it possible to govern the speed in accordance with the requirements of the drives, i.e. to keep to a speed program which is set via the position control circuit 33, 34, 37 of the quantity control.

Figure 2:
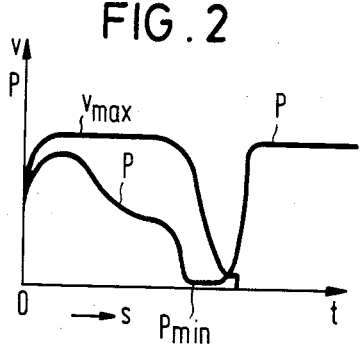
FIG. 2 is a speed-pressure diagram of the clamping cylinder.

For example, in FIG. 2 such a speed program v is shown for the closure movement of the clamping cylinder 1 along the piston stroke s. From the stationary position 0 the speed v rapidly increases and reaches a maximum value which is maintained constant until towards the end of the clamping movement whereupon the speed is reduced until the mould half 3 is placed on the mould half 4 at "closed".

In addition, in FIG. 2 the hydraulic pressure p acting on the piston 2 is plotted. To accelerate the masses to the closing speed firstly a high pressure is necessary which then drops during the further closure movement until just before the closing of the mould the pressure is lowered to a minimum value $p_{min}$. This pressure drop serves to protect the mould because from the preceding injection moulding operation the moulding might have remained stuck between the mould halves 3, 4. If the mould half 3 were placed with full pressure onto the mould half 4 this might result in damage to the mould. For this reason, just before the closure of the mould the pressure in the clamping cylinder is almost completely removed so that when a resistance is encountered the mould half 3 automatically stops. If however the mould is closed the clamping cylinder 1 is subjected to the full clamping pressure $p_{clamp}$ to make sure that the mould is kept closed in the subsequent injection of the plastic into the mould cavity 12.

A certain pressure is also necessary in the line 20 for pressing the injection nozzle 10 against the fixed mould half 4. The same applies to the motor 5 for driving the plasticizing screw. The speed of rotation of the motor is governed by the displacement of the adjusting pump 26 whereas to overcome the resistance of the plastic granulate a predetermined pressure in the line 20 is necessary. With increasing plasticizing the load resistance of the plasticizing screw 6 drops. On the other hand the plasticizing screw because of its rotation exerts a counter pressure which tends to displace the piston 7 of the injection cylinder 8 connected to the screw 6 to the right in FIG. 1. To compensate this force of the screw 6 in the chamber 9 of the injection cylinder 8 a counter pressure is built up which is designated hereinafter as dynamic pressure. The pressure variation of the cylinder 15, the motor 5 and the dynamic pressure are not illustrated in detail.

Figure 3:
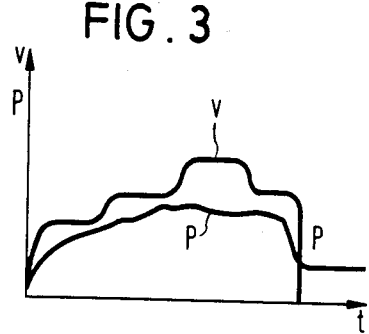
FIG. 3 is a speed-pressure diagram of the injection cylinder.

Once the plasticizing operation is concluded by actuating the injection cylinder 8 after pressing on the injection nozzle 10 the plasticized plastic is injected into the mould cavity 12. In the injection a speed program v is observed as illustrated in FIG. 3. The speed may be governed in several stages to permit a uniform filling of the mould cavity 12. This speed program is likewise regulated via the quantity of volumetric regulation of the adjusting pump 26. The pressure then arising in the chamber 9 of the injection cylinder 8 is designated by p in FIG. 3. Towards the end of the introduction operation, which is designated in FIG. 3 by "full", a predetermined after-pressure $p_{after}$ is set in the chamber 9 and is maintained during the cooling of the casting until opening of the mould in order to maintain the complete filling of the mould.

Thus, for the actuation of the drives certain pressures must be set. In the form of the invention shown in FIG. 1 all the necessary pressures are regulated at the directional proportional valve 22. The proportional valve 22 thus has several functions, that is injecting the plastic into the mould by subjecting the piston 7 to working medium, generating the pressure necessary for the injection cylinder 8, generating the dynamic pressure in the cylinder chamber 9 and furnishing the necessary pressures in the line 20 for acting on the other drives.

The proportional valve 22 has several positions which are designated in FIG. 1 by a to e. In the position c illustrated the pressure line 20 is shut off and the space 9 of the injection cylinder 8 connected to the tank T. In this position the piston 7 can be moved to a starting position in which the plasticizing operation takes place. The return of the piston 7 to the starting position can be effected either by an auxiliary drive, not shown, or by the backpressure of the plasticizing screw 6.

In the position a the pressure line 20 is connected to the tank and the injection cylinder also connected to the tank. Proceeding from this idling position the slide of the proportional valve can be displaced into the position b in which the pressure line 20 is shut off and the injection cylinder chamber 9 connected to the tank. It is in the nature of the proportional valve for the connection of the pressure line 20 to the tank T to be increasingly throttled in the intermediate positions between a and b, therefore increasing the pressure in the pressure line 20. Thus, proceeding from the position a to the position b the pressure in the pressure line 20 can be increased from 0 to $t_{max}$ and the individual drives 1, 5 and 15 subjected to the necessary pressure. A requirement is of course that the adjusting pump 26 is able to furnish at the respective quantity setting a pressure which is at least equal to the desired pressure.

For the pressure regulation in the line 20 the proportional valve 22 is driven by a regulating or automatic gain control amplifier 40 to which the control deviation is supplied via a switch 41 from a comparator 42 to which the output of the pressure sensor 24 and an input for a command quantity as desired value of the pressure are connected. The pressure regulation in the position a/b thus depends on the entered desired value pressure and the actual value measured in the line 20 as controlled value of the pressure.

In this manner it is for example very simply possible to obtain the pressure drop for the mould protection of the mould halves 3, 4 as illustrated in FIG. 2. Just before the closure of the mould the pressure desired value is reduced at the comparator 42 to $p_{min}$, the proportional valve moves in the direction of the position a and an immediate pressure drop in the pressure line 20 results. Such a rapid pressure drop is not possible with pressure regulation at the pump in known designs because such a pressure control reacts too sluggishly. The other pressures necessary in the system may also be set rapidly and simply in this manner.

For the pressure control in the injection cylinder 8 the switch 41 is switched by a program means, not illustrated, so that the controlled variable measured by the pressure sensor 23 is passed to a comparator 43 to which desired values for the injection cylinder pressure are supplied. The resulting control deviation is connected via the switch 41 to the regulating amplifier 40 and the resulting controlling variable passed to the proportional valve 22. For injection of the plastic the proportional valve 22 is moved by the program control to the position e. As this is done no pressure regulation takes place. On the contrary, the speed program v illustrated in FIG. 3 for insertion of the plastic is implemented by the quantity control of the pump 26. Once the injection is concluded the proportional valve 22 thus moves to the position d in which by the resulting throttle cross-sections between the pressure line 20 and the injection cylinder chamber 9 or the tank T the after-pressure defined at the comparator 43 is set.

The injection moulding machine thus operates as follows:

1. Plasticizing

The directional valve 19 for actuating the plasticizing motor 5 is switched to the open position. The speed of rotation of the motor 5 is governed by the quantity regulation of the adjusting pump 26 which is also set by the program. A maximum pressure is obtained by a spring-loaded pressure relief valve 60.

2. Generation of dynamic pressure in the injection cylinder

The proportional valve 22 is displaced increasingly in the direction of the position b. Via the throttle cross-section arising between the injection cylinder 9 and the tank a dynamic pressure is generated in the chamber 9 sufficient for application of the screw 6 in plasticizing. In this phase the pressure in the line 20, i.e. the pressure necessary for the motor 5 for driving the plasticizing screw, need not be separately regulated. The control of the proportional valve 22 is via the control circuit 40, 41 and 43 in dependence upon the pressure in the chamber 9 which is measured by the pressure sensor 23. The quantity regulation of the pump 26 governs the speed of rotation of the motor 5.

3. Move-up clamping cylinder

The pressure necessary for this in the line 20 is also set by the proportional valve 22 depending upon the actual value of the pressure which is measured by the sensor 24 in the line 20. The speed is governed by the program via the quantity control.

4. Close clamping cylinder

After the removal of the moulding the clamping cylinder is closed in accordance with the program illustrated in FIG. 2 and the pressure regulation again takes place at the proportional valve 22 in position a/b in dependence upon the sensor 24. The retardation of the masses can take place by a proportional throttle valve, not illustrated, instead of the directional valve 17.

5. Press-on injection nozzle

Pressure control as described under 3.

6. Actuate injection cylinder

The proportional valve 22 is switched by the program control to position e. The injection of the plastic into the mould by the piston 7 of the injection cylinder takes place according to the program illustrated in FIG. 3 by means of the quantity control of the pump 26.

7. Generate after-pressure

As soon as the insertion operation is concluded the proportional valve 22 is brought into the position d to generate by the set throttle cross-section in the position d in the injection cylinder chamber 9 the after-pressure necessary for the moulding. The changeover can for example take place automatically when the pressure occurring due to the insertion resistance rises to a predetermined value which is measured by the pressure sensor 23, whereupon the switch 41 is switched over to activate the pressure control circuit 40, 41, 43. At the same time the pump 26 is switched to maximum pressure by the displacement being adjusted towards 0. The changeover can however also take place via a mould internal pressure measurement or in dependence upon the travel.

The return of the injection cylinder together with the motor 5 and the plasticizing screw 6 into the starting position can take place by an external force, for example in the plasticizing.

Figure 4:
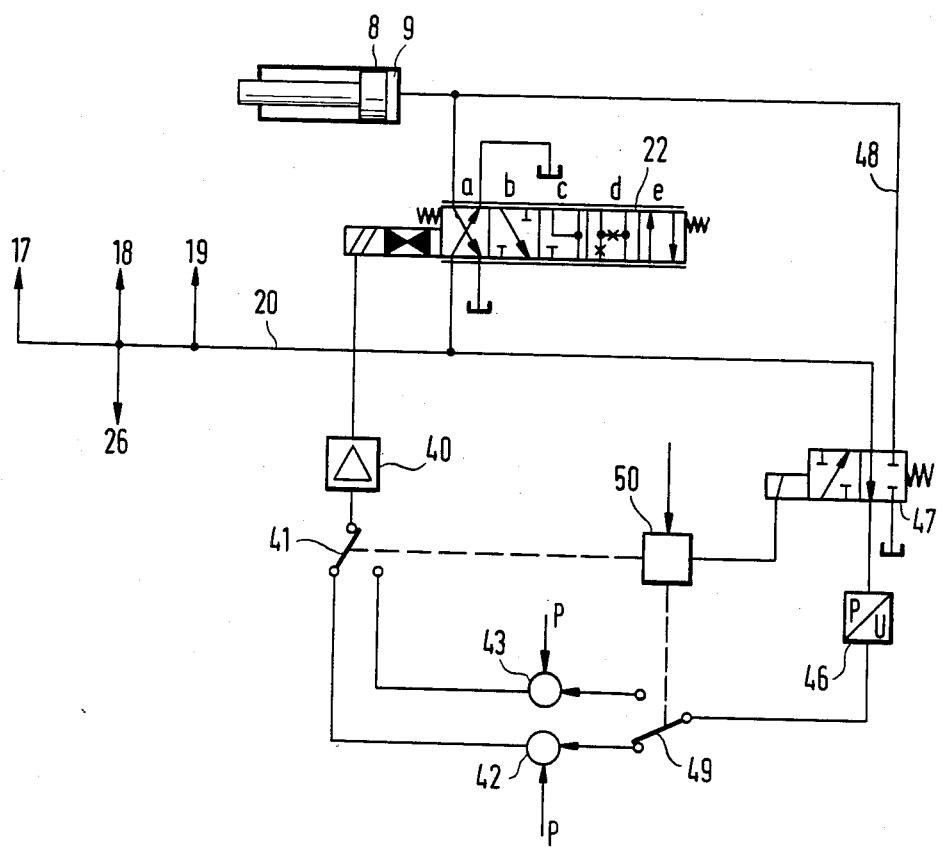
FIG. 4 is a schematic view for the pressure regulation in a modified embodiment and FIG. 5 is a further embodiment of the pressure regulation.

FIG. 4 illustrates a modified embodiment of the drive of the proportional valve 22. The difference from FIG. 1 resides in that only a single pressure sensor 46 is provided which is connectable via a switching valve 47 selectively to the pressure line 20 or via a line 48 to the pressure chamber of the injection cylinder 8. The controlled variable measured in the line 20 or in the pressure chamber 9 is applied via a switch 49 to the comparator 42 or the comparator 43 and from there via the switch 41 as control deviation to the regulating amplifier 40, by the controlling quantity of which the proportional valve is actuated. The switching over of the valve 47 and the switches 41 and 49 is via a program switch 50.

All other components of the injection moulding machine are identical to the illustration of FIG. 1 so that they will not be shown again in FIG. 4.

Figure 5:
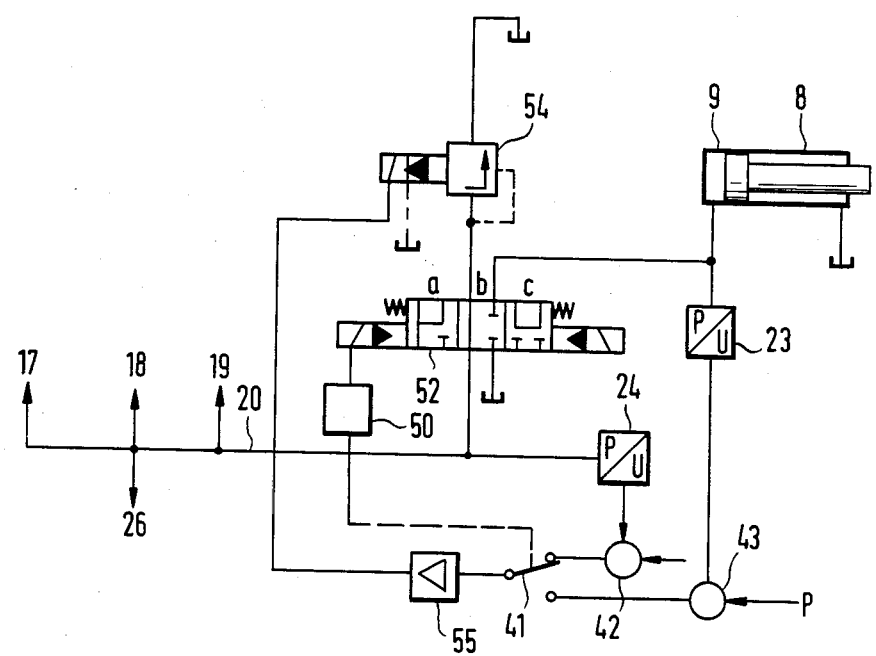

In FIG. 5 the drives connected to the pressure line 20 and the pump for fluid supply are also identical to the embodiment illustrated in FIG. 1 and are therefore not illustrated again. The injection cylinder 8 is however not connected via a proportional valve to the pressure line but via a switching valve 52 whose switching positions are denoted by a, b and c. In the switching position b illustrated the pressure line 20 is connected via a switching valve 52 to a pressure-limiting valve 54 at which the particular desired pressure is electrically settable. For this purpose the pressure-limiting valve 54 is driven by a regulating or automatic gain control amplifier 55. As already explained in FIG. 1 the regulating amplifier 55 is subjected via the switch 41 to the control deviation determined in the comparator 42 between the actual value of the pressure measured with the sensor 24 in the line 20 and the desired value of the pressure when the system pressure in the pressure line 20 is to be controlled. The switch 51 is actuated so that the regulating amplifier 55 is subjected to the control deviation in the comparator 43 between the actual value of the pressure in the chamber 9 of the injection cylinder 8 measured by the pressure sensor 25 and the desired value input of the pressure when the pressure for the injection cylinder is to be controlled. The changeover of the switch 41 and of the valve 52 is once again effected by a program circuit 50.

In the position a of the valve 52 the injection cylinder 8 is acted upon by working medium; firstly, via the volumetric or quantity control of the pump injection of the plastic takes place according to the preset speed program and then to build up the after-pressure the pressure-limiting valve 54 is set to the desired magnitude of said after-pressure.

In the position c in the chamber 9 of the injection cylinder 8 a dynamic pressure can be generated whose magnitude is also set at the pressure-limiting valve 54. The chamber 9 is connected via the pressure-limiting valve 54 to the tank T.

We claim:

1. Means for pressure and quantity control of hydraulic drives in an injection moulding machine, said machine consisting of an injection cylinder, a clamping cylinder, and a plasticizing motor, said control means comprising respective directional valves controlling a communication of said cylinder and said motor with the output line of a variable displacement pump and a tank, a quantity control for setting the displacement of said variable displacement pump in response to a command variable and a pressure control for setting the pressure in said output line in response to a command quantity defining the pressure, characterized in that said variable displacement pump has only a quantity control, pressure control being effected by operating a one directional valve in said output line to the tank via a regulatable throttle governing the pressure.

2. Means according to claim 1, characterized in that the one directional valve connects the injection cylinder to the output line.

3. Means according to claim 1, characterized in that the one directional valve is a proportional directional valve which has a throttle for system pressure regulation.

4. Means according to claim 3, characterized in that the throttle cross-section of the proportional directional valve is controllable between a first position connecting the output line to the tank and a second position closing the output line.

5. Means according to claim 4, characterized in that a pressure chamber of the injection cylinder is connectable to the tank via a throttle cross-section of the proportional valve between the first and second positions thereof for generating a dynamic pressure in the chamber.

6. Means according to claim 3, characterized in that the proportional valve has a third position which connects the output line to the injection cylinder and in which the piston speed of the injection cylinder is set by the quantity control of the pump, and a fourth throttle position for building up the after-pressure in the injection cylinder.

7. Means according to claim 1, characterized in that the one directional valve is a switching valve having a first position for system pressure control by connecting the output line to a pressure-limiting valve.

8. Means according to claim 7, characterized in that the one directional valve has a second position connecting the pressure chamber of the injection cylinder to a pressure adjustable by the pressure-limiting valve.

9. Means according to claim 8, characterized in that in a third position of the one directional valve the pressure chamber of the injection cylinder is connected to the tank via the pressure-limiting valve and a dynamic pressure can be set at the pressure-limiting valve.

10. Means according to claim 1, characterized in that the control circuit for actuating the one directional valve for pressure regulation can be subjected selectively to the controlled quantity for the system pressure or the pressure in the injection cylinder.

* * * * *